US011080172B2

(12) United States Patent
Baghdadi (10) Patent No.: US 11,080,172 B2
(45) Date of Patent: Aug. 3, 2021

(54) INSTRUCTION COUNT BASED COMPILER PERFORMANCE REGRESSION TESTING

(71) Applicant: International Business Machines Corporation, Armonk, NY (US)

(72) Inventor: Gaby Baghdadi, Scarborough (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 16/572,714

(22) Filed: Sep. 17, 2019

(65) Prior Publication Data

US 2021/0081305 A1    Mar. 18, 2021

(51) Int. Cl.
    *G06F 11/36*    (2006.01)

(52) U.S. Cl.
    CPC ...... *G06F 11/3684* (2013.01); *G06F 11/3688* (2013.01)

(58) Field of Classification Search
    CPC .................. G06F 11/3684; G06F 11/3688
    See application file for complete search history.

(56) References Cited

U.S. PATENT DOCUMENTS

| | | | | |
|---|---|---|---|---|
| 8,230,401 B2 * | 7/2012 | Branca | ................ | G06F 11/3688 717/135 |
| 8,276,126 B2 * | 9/2012 | Farnham | ................... | G06F 8/71 717/131 |
| 9,037,915 B2 * | 5/2015 | D'Alterio | ........... | G06F 11/3692 714/38.1 |
| 10,146,676 B1 * | 12/2018 | Khanduri | ............ | G06F 11/3692 |
| 10,212,058 B2 | 2/2019 | Salama et al. | | |
| 10,783,051 B2 * | 9/2020 | Srinivasan | .......... | G06F 11/3419 |
| 2010/0333072 A1 * | 12/2010 | Dulip | ................... | G06F 11/3419 717/128 |
| 2013/0151906 A1 * | 6/2013 | D'Alterio | ........... | G06F 11/3692 714/38.1 |
| 2014/0096115 A1 * | 4/2014 | Guan | ........................ | G06F 8/41 717/140 |
| 2015/0186253 A1 | 7/2015 | Abraham et al. | | |
| 2019/0138428 A1 * | 5/2019 | Sumitomo | .......... | G06F 9/44536 |
| 2020/0034282 A1 * | 1/2020 | He | ....................... | G06F 11/3688 |

OTHER PUBLICATIONS

Gergo Barany, "Finding Missed Compiler Optimizations by Differential Testing" (Year: 2018).*

(Continued)

*Primary Examiner* — Phillip H Nguyen
(74) *Attorney, Agent, or Firm* — Cantor Colburn LLP; Peter Wang (57) ABSTRACT

Techniques for instruction count based compiler performance regression testing are described herein. An aspect includes identifying a subset of a plurality of test cases that are regression suspects for a current build of a compiler, wherein the identifying of a test case of the plurality of test cases as a regression suspect is performed based on an instruction count associated with compiling or running of the test case using the current build of the compiler and a previous build of the compiler. Another aspect includes processing the subset of the plurality of test cases to identify any test cases associated with confirmed regressions.

17 Claims, 5 Drawing Sheets

(56) References Cited

OTHER PUBLICATIONS

Iwatsuji et al., "Detecting Missed Arithmetic Optimization in C Compilers by Differential Random Testing" (Year: 2016).*
Kevin Hannigan, "An Empirical Evaluation of the Indicators for Performance Regression Test Selection" (Year: 2018).*
Hugh Leather, "Machine Learning in Compiler" (Year: 2010).*
Dubach et al., "Fast compiler optimisation evaluation using code-feature based performance prediction" http://homepages.inf.ed.ac.uk/cdubach/papers/dubach07cf.pdf, May 8, 2007. pp. 131-142.
Huang et al., Performance regression testing target prioritization via performance risk analysis. http://opera.ucsd.edu/paper/icse14-perfscope.pdf, Jun. 7, 2014. pp. 60-71.

* cited by examiner

INSTRUCTION COUNT BASED COMPILER PERFORMANCE REGRESSION TESTING

BACKGROUND

The present invention generally relates to computer systems, and more specifically, to instruction count based compiler performance regression testing in a computer system.

Compilers are programs that translate source code into object code. A compiler looks at the source code and collects and reorganizes the instructions in order to translate the source code into object code.

A compiler is included with a high level programming language. Examples of high level programming languages include but are not limited to C, C++, Fortran, Pascal, etc. The compiler may be written in the same language as the high level programming language, or in a different language.

Developers of a compiler may revise the compiler for reasons including but not limited to enhancing the functionality, enhance performance, and fixing issues. However, when changes are made to a compiler, it may be time-consuming to verify that changes that have been made to the compiler have not regressed the performance of the compiler.

SUMMARY

Embodiments of the present invention are directed to instruction count based compiler performance regression testing. A non-limiting example computer-implemented method includes identifying a subset of a plurality of test cases that are regression suspects for a current build of a compiler, wherein the identifying of a test case of the plurality of test cases as a regression suspect is performed based on an instruction count associated with compiling or running of the test case using the current build of the compiler and a previous build of the compiler. The method also includes processing the subset of the plurality of test cases to identify any test cases associated with confirmed regressions.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide instruction count based compiler performance regression testing. Performance regression testing of a compiler may be performed to determine whether a new build of a compiler takes longer to compile a given source code as compared to a previous build of the compiler (i.e., whether compile time has increased), and/or if executable object code generated by the new build of the compiler takes longer to execute (i.e., whether run time has increased). Compile time and run time may be determined based on either a central processing unit (CPU) time or an elapsed (clock) time, which may be collectively referred to herein as time. To measure the time relatively accurately, the computer system that is performing the regression testing must be in a same state when a test case is run for both builds of the compiler that are being compared. However, it may not be possible to maintain the state of the computer system, which may vary based at least on the computational load that is being processed by the computer system. Therefore, a number of test cases may be run sequentially (i.e., one at a time) multiple times in order to determine a least time or average time to use for the regression comparison. For a relatively large number of test cases, such regression testing may require a large amount of time, due to the need to compile and run the test cases sequentially. The relatively large amount of time required for such regression testing may be a problem in, for example, situations in which a relatively large numbers of test cases are to be tested for performance regressions in a relatively short period of time, such as a Continuous Integration Testing environment. Therefore, in order to allow compiling and running of test cases in parallel, instruction count may be used as a metric to identify test cases that may be affected by any changes in a current build of a compiler. While CPU time or elapsed time may be significantly affected by the number of test cases being processed in parallel, instruction count may be determined relatively accurately independent of the state of the computer system.

A suspect identification phase may compile and run multiple test cases concurrently, for increased throughput, and gather the instruction count of each compile and/or run step. A subset of test cases may be identified based on the suspect identification phase, based on a change in the number of instructions that compiling or running a test case executes, which may affect both compile time and run time. In some embodiments, a test case may be identified as a regression suspect, and added to the subset, based on the instruction count differing between the current build and a previous build of the compiler by at least a given factor (e.g. 0.5%). A confirm regression phase may then compile and run only the test cases in the regression suspect subset sequentially. The regression suspect test cases may be a relatively small subset of all the test cases. Therefore, running the regression suspect test cases in sequence in the confirm regression phase may require less time than running all the test cases sequentially. In some embodiments, each test case may be run multiple times in the confirm regression phase, from which a least time or average time may be obtained for the regression testing comparison. In some embodiments of compiler performance regression testing, a final performance regression test may be performed, after one or more iterations of the suspect identification phase and confirm regression phase, that includes compiling and running all of the test cases sequentially, as one or more test cases that may indicate a performance regression in the compiler may not be detected based on the instruction count metric.

Figure 1:
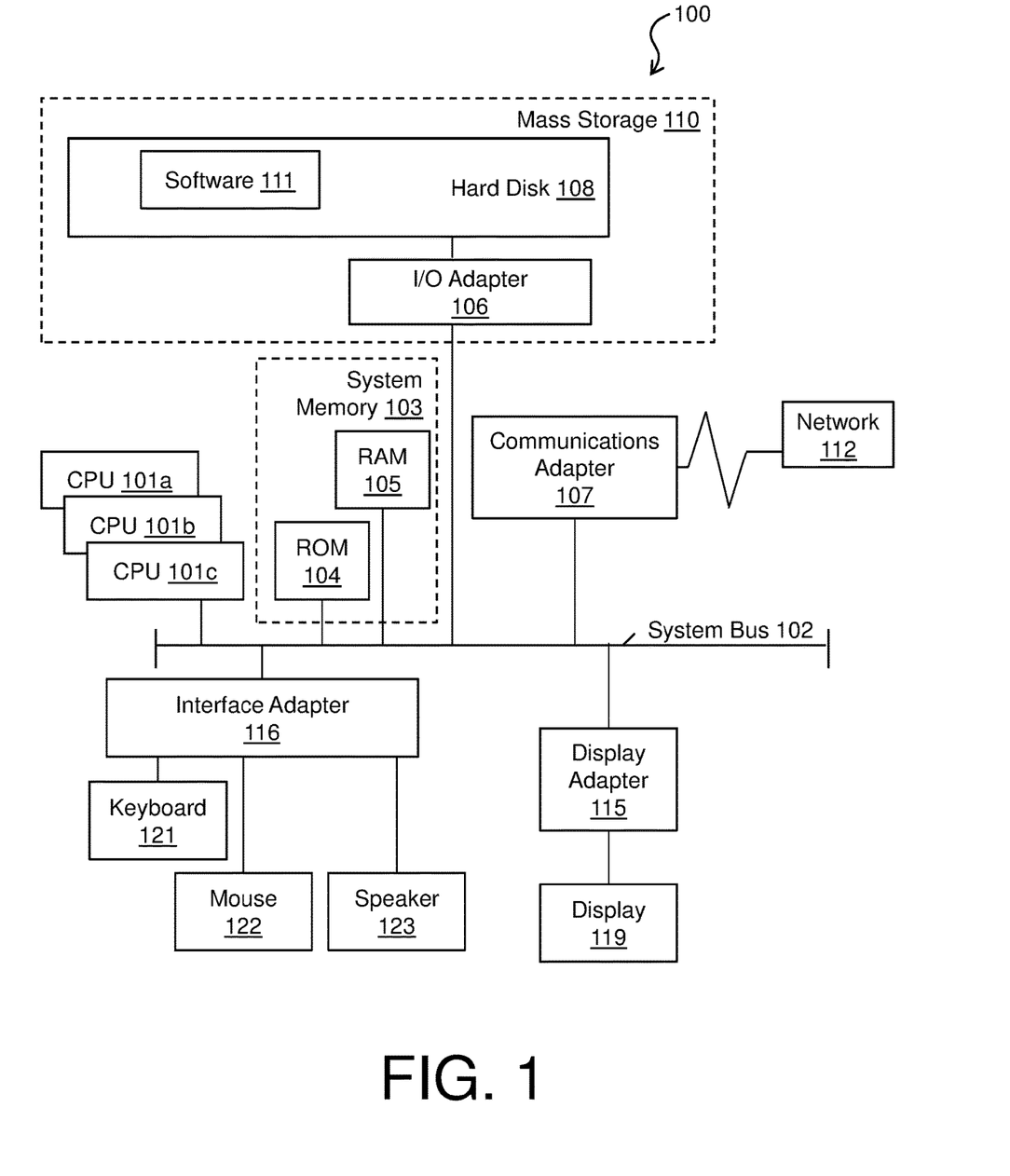
FIG. 1 is a block diagram of an example computer system for use in conjunction with one or more embodiments of instruction count based compiler performance regression testing.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
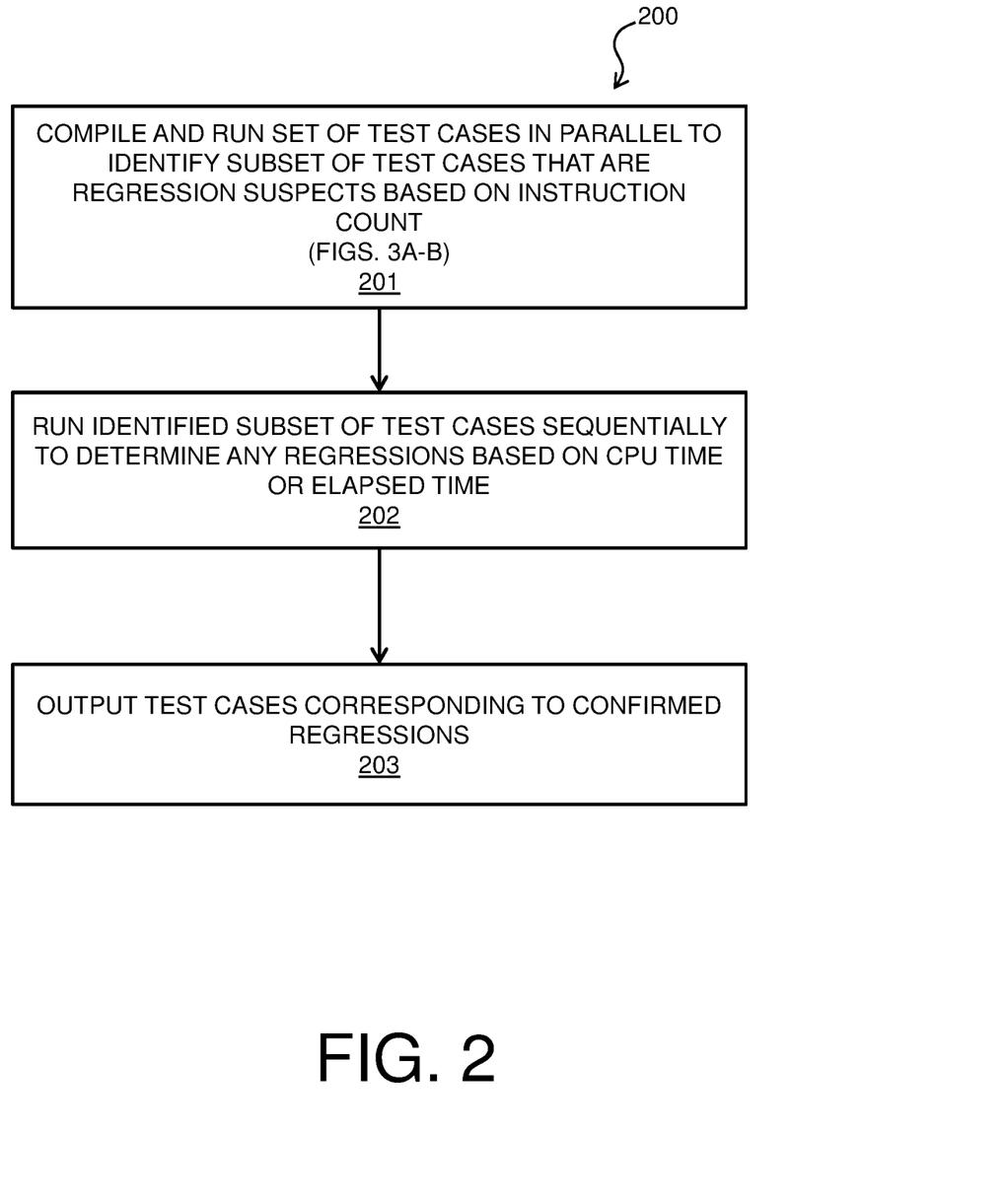
FIG. 2 is a flow diagram of a process for instruction count based compiler performance regression testing in accordance with one or more embodiments of the present invention.

FIG. 2 shows a process flow diagram of a method 200 for instruction count based compiler performance regression testing in accordance with one or more embodiments of the present invention. Method 200 may be implemented in any appropriate computer system, such as computer system 100 of FIG. 1. For example, method 200 may be implemented in software 111, and may operate on data stored in mass storage 110 and/or system memory 103. In block 201 of method 200, a plurality of test cases are compiled and run concurrently (i.e., in parallel) to identify a subset of the plurality of test cases that are regressions suspects, e.g., may indicate regression problems in a current build of the compiler as compared to a previous build of the compiler. The determination as to whether a test case belongs in the determined subset is made based on an instruction count, e.g., a number of instructions that are executed during compiling of the test case, and/or a number of instructions that are executed during running of the test case. The instruction count may be determined in block 201 in any appropriate manner in various embodiments. For example, on a computer system that is running Linux, the number of instructions executed by a running process may be obtained by running the process with the "perf" tool. Block 201 of FIG. 2 is discussed in further detail with respect to methods 300A-B of FIGS. 3A-B. Either or both of methods 300A-B of FIGS. 3A-B may be applied in block 201 to a plurality of test cases in parallel in various embodiments of block 201 of FIG. 2.

In block 202 of method 200, the test cases in the subset that were identified as having possible regression problems in block 201 are compiled and run sequentially (i.e., one at a time) to determine any cases in the subset that correspond to confirmed regressions. The determination of block 202 for a test case in the subset may be made based on, for example, an increase in a CPU time or an elapsed time associated with the compiling or the running of the test case by the current build of the compiler. The increase may be determined by comparing a CPU time or an elapsed time associated with the compiling or running of a test case using the current build of the compiler to a CPU time or an elapsed time associated with the compiling or running of the test case using the previous build of the compiler. In block 203, any test cases from the subset that were determined in block 202 to correspond to confirmed regressions are output. The output test cases that correspond to confirmed regressions may be used to examine and correct the current build of the compiler by, for example, a software developer. Method 200 of FIG. 2 may be performed repeatedly throughout the development and testing of a compiler; for a subsequent iteration of method 200 of FIG. 2, a current build of the compiler may become the previous build in order to regression test a newer build of the compiler.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3A:
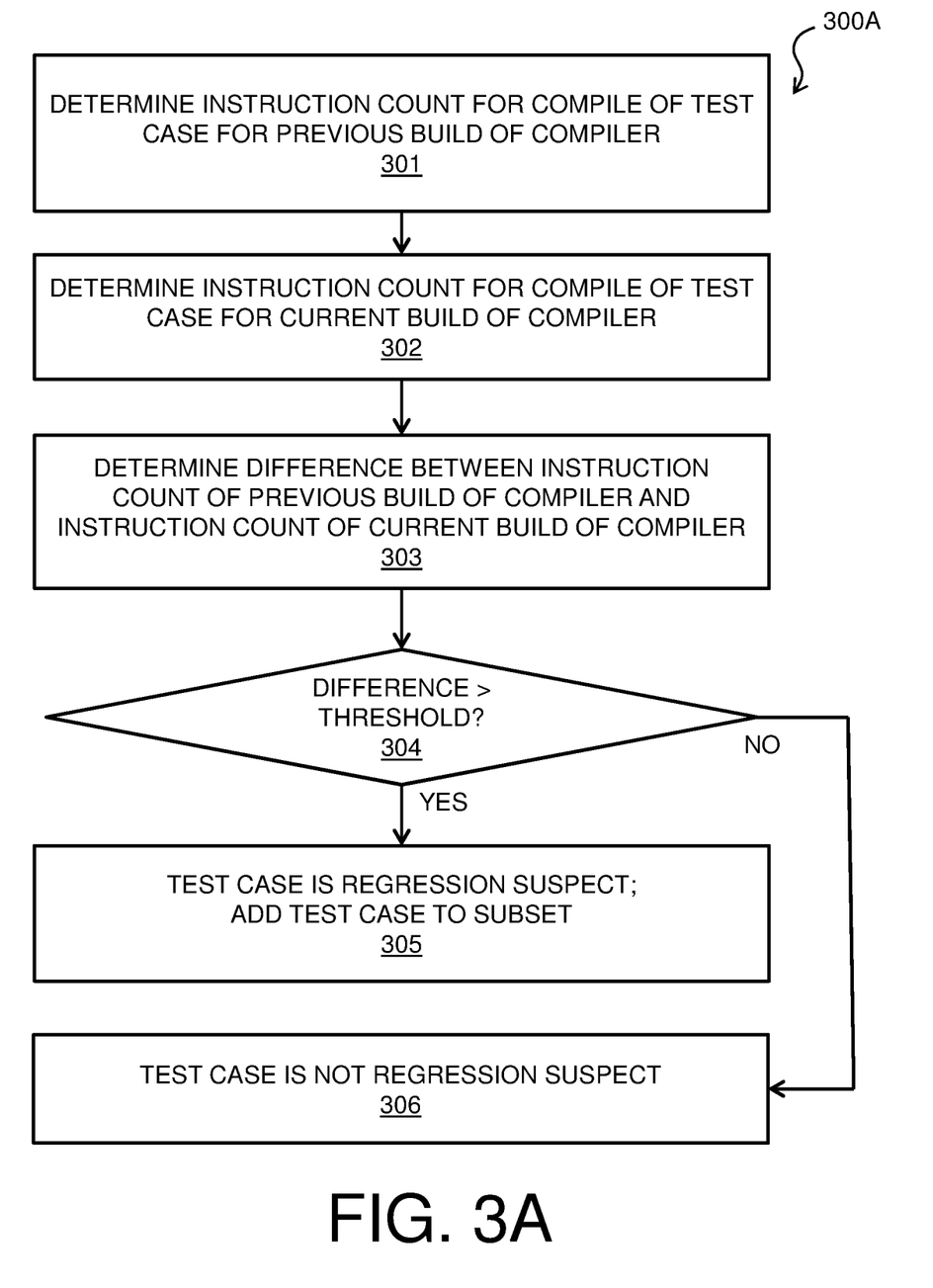
FIG. 3A is a flow diagram of a process for regression suspect identification for instruction count based compiler performance regression testing in accordance with one or more embodiments of the present invention.

FIG. 3A shows a process flow diagram of a method 300A for regression suspect identification for instruction count based compiler performance regression testing in accordance with one or more embodiments of the present invention. Method 300A of FIG. 3A may be performed in parallel for each of a plurality of test cases in block 201 of method 200 of FIG. 2. In block 301 of method 300A, source code of a test case is compiled into object code by a previous build of a compiler, and a first instruction count is determined for the compilation of the test case by the previous build of the compiler. The first instruction count may be a number of instructions that were executed in the process of compiling the test case by the previous build of the compiler. In block 302, the source code of the test case is compiled into object code by a current build of the compiler, and a second instruction count is determined for the compilation of the test case by the current build of the compiler. The second instruction count may be a number of instructions that were executed in the process of compiling the test case by the current build of the compiler. In block 303, a difference between the first instruction count that was determined in block 301 and the second instruction count that was determined in block 302 is determined. In block 304, it is determined whether the difference that was determined in block 303 is above a threshold. In some embodiments, the threshold may be a percentage increase or decrease in the second instruction count as compared to the first instruction count, e.g., the second instruction count being higher than the first instruction count by a given factor (e.g., 0.5%). The threshold may be any appropriate value, and may be set by a performance tester or developer in some embodiments.

If it is determined in block 304 that the difference is above the threshold, flow proceeds from block 304 to block 305. In block 305, the test case is determined to be a regression suspect and is added to the subset of test cases that are processed in block 202 of FIG. 2. If it is determined in block 304 that the difference is not above the threshold, flow proceeds from block 304 to block 306, in which it is determined that the test case is not a regression suspect, and method 300A ends.

The process flow diagram of FIG. 3A is not intended to indicate that the operations of the method 300A are to be executed in any particular order, or that all of the operations of the method 300A are to be included in every case. Additionally, the method 300A can include any suitable number of additional operations.

Figure 3B:
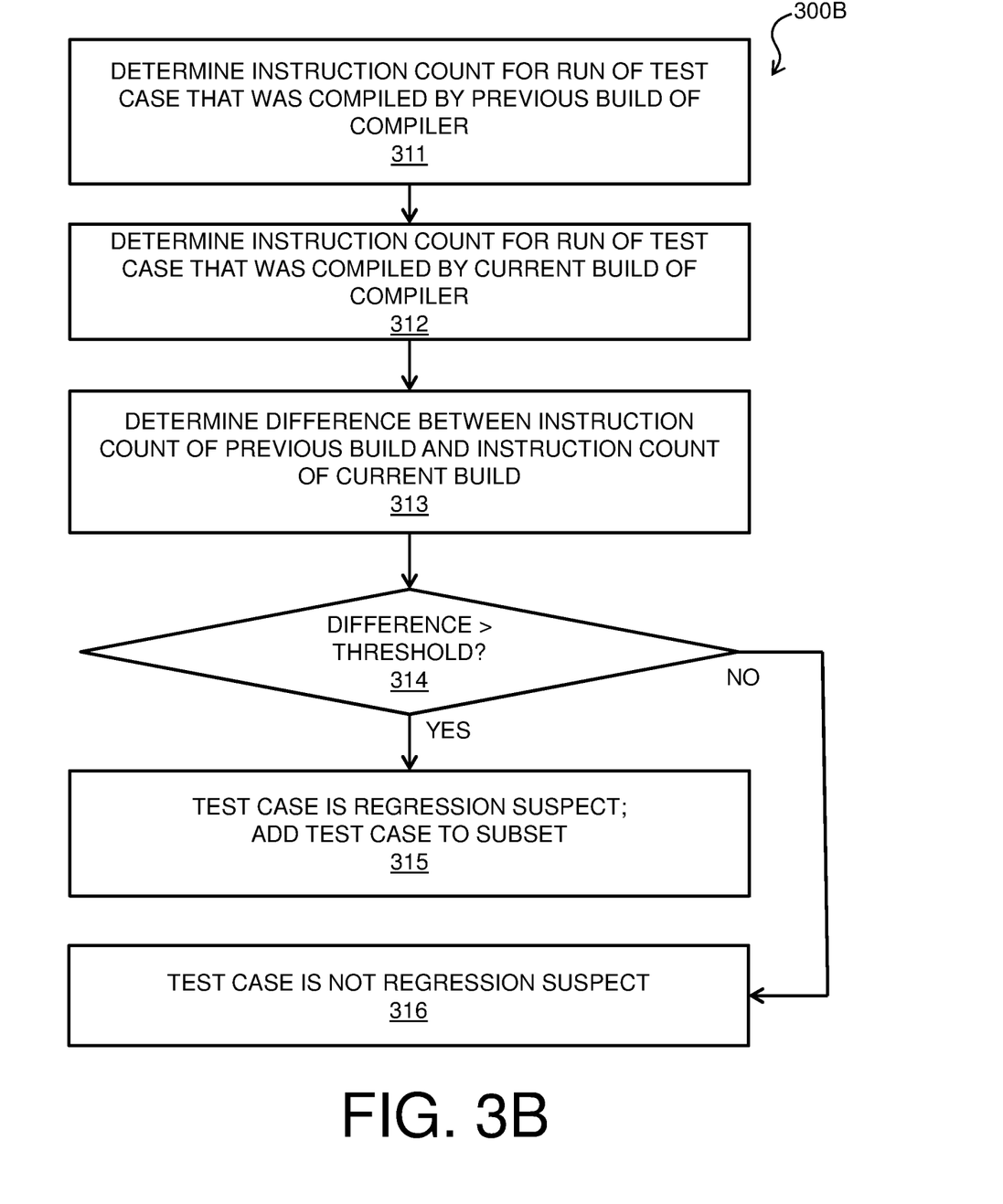
FIG. 3B is a flow diagram of another process for regression suspect identification for instruction count based compiler performance regression testing in accordance with one or more embodiments of the present invention.

FIG. 3B shows a process flow diagram of another method 300B for regression suspect identification for instruction count based compiler performance regression testing in accordance with one or more embodiments of the present invention. Method 300B of FIG. 3B may be performed in parallel for each of a plurality of test cases in block 201 of method 200 of FIG. 2. In block 311 of method 300B, object code of a test case that was compiled by a previous build of a compiler (e.g., as was performed in block 301 of FIG. 3A) is run in a runtime environment, and a first instruction count is determined for the running of the test case that was compiled by the previous build of the compiler. The first instruction count may be a number of instructions that were executed in the process of running the test case that was compiled by the previous build of the compiler. In block 312, object code of the test case that was compiled by a current build of the compiler (e.g., as was performed in block 302 of FIG. 3A) is run by the runtime environment, and a second instruction count is determined for the running of the test case that was compiled by the current build of the compiler. The second instruction count may be a number of instructions that were executed in the process of running the test case that was compiled by the current build of the compiler. In block 313, a difference between the first instruction count that was determined in block 311 and the second instruction count that was determined in block 312 is determined. In block 314, it is determined whether the difference that was determined in block 313 is above a threshold. In some embodiments, the threshold may be a percentage increase or decrease in the second instruction count as compared to the first instruction count, e.g., the second instruction count being higher than the first instruction count by a given factor (e.g., 0.5%).

If it is determined in block 314 that the difference is above the threshold, flow proceeds from block 314 to block 315. In block 315, the test case is determined to be a regression suspect and is added to the subset of test cases that are processed in block 202 of FIG. 2. If it is determined in block 314 that the difference is not above the threshold, flow proceeds from block 314 to block 316, in which it is determined that the test case is not a regression suspect, and method 300B ends.

The process flow diagram of FIG. 3B is not intended to indicate that the operations of the method 300B are to be executed in any particular order, or that all of the operations of the method 300B are to be included in every case. Additionally, the method 300B can include any suitable number of additional operations.

Figure 4:
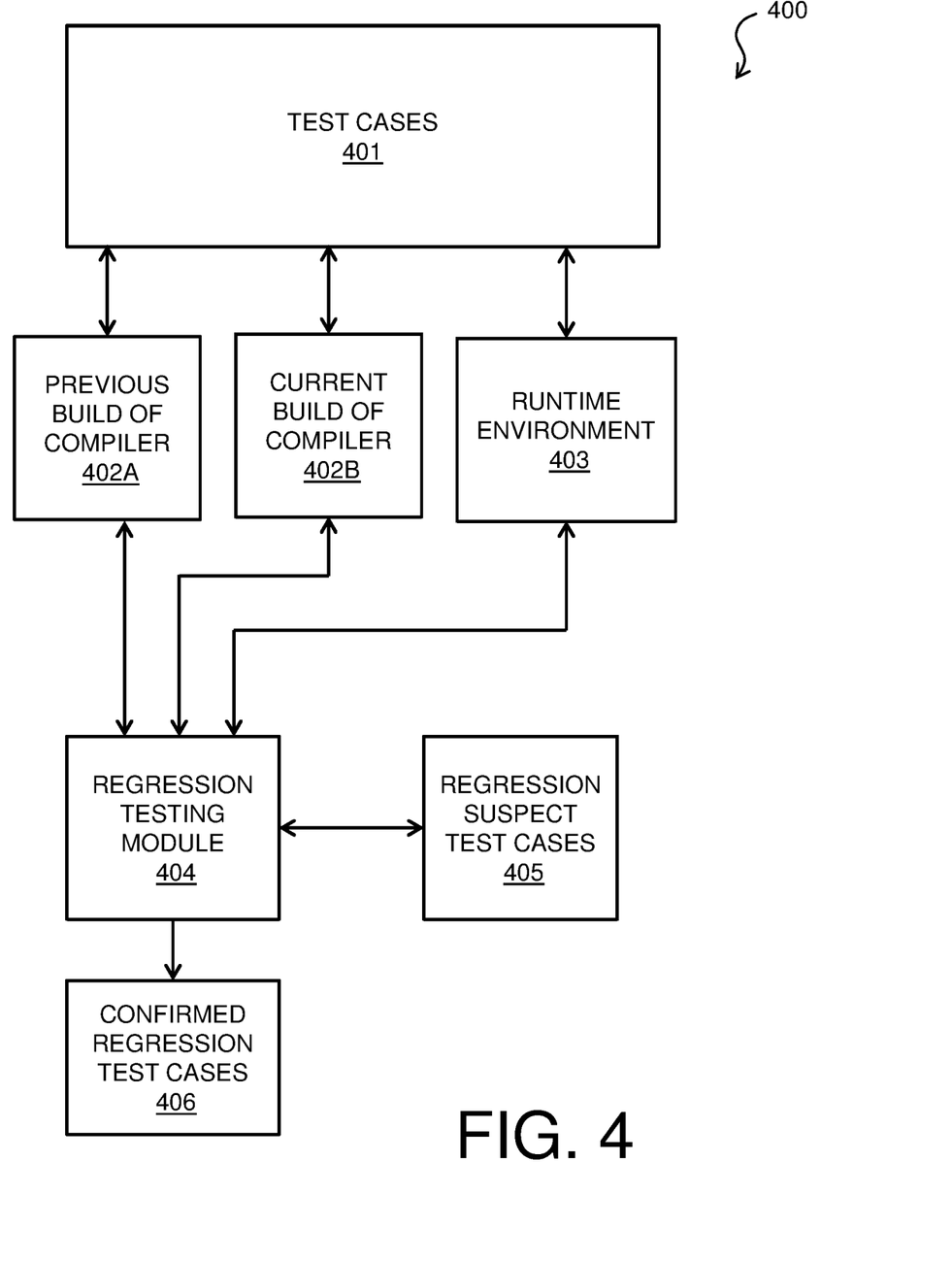
FIG. 4 is a block diagram of components of a system for instruction count based compiler performance regression testing in accordance with one or more embodiments of the present invention.

Turning now to FIG. 4, a system 400 for instruction count based compiler performance regression testing is generally shown in accordance with one or more embodiments of the present invention. System 400 may be implemented in conjunction with any appropriate computer system, such as computer system 100 of FIG. 1, and may implement method 200 of FIG. 2 and methods 300A-B of FIGS. 3A-B. System 400 includes a plurality of test cases 401 that are used to regression test a current build of a compiler 402B by regression testing module 404. The test cases 401 include source code. There may be any appropriate number of test cases 401; in some embodiments, there may be thousands of test cases in test cases 401. As described above with respect to block 201 of method 200 FIG. 2 and methods 300A of FIG. 3A, source code of each of the test cases 401 are compiled into object code by both the previous build of the compiler 402A and the current build of the compiler 402B. An instruction count for the compilation of a test case of test cases 401 by the previous build of the compiler 402A and an instruction count for the compilation of the test case of the test cases 401 by the current build of the compiler 402B are compared by regression testing module 404 to determine whether the test case is a regression suspect, as described above with respect to method 300A of FIG. 3A. If it is determined that a test case of the test cases 401 is a regression suspect according to method 300A of FIG. 3A, the test case is added by regression testing module 404 to regression suspect test cases 405, which may be a subset of the test cases 401.

As described above with respect to block 201 of method 300 FIG. 2 and methods 300B of FIG. 3B, the object code for each of the test cases 401 that was produced by each of the previous build of the compiler 402A and the current build of the compiler 402B are run by the runtime environment 403. An instruction count for the running of a test case of test cases 401 that was compiled by the previous build of the compiler 402A and an instruction count for the running of the test case of the test cases 401 that was compiled by the current build of the compiler 402B are compared by regression testing module 404 to determine whether the test case is a regression suspect, as described above with respect to method 300B of FIG. 3B. If it is determined that a test case of the test cases 401 is a regression suspect based on the running of the test case, the test case is added by regression testing module 404 to regression suspect test cases 405, which is a subset of the test cases 401. Any number of test cases 401 may be compiled and run in parallel by previous build of the compiler 402A, current build of the compiler 402B, and runtime environment 403 in order to determine regression suspect test cases 405 by regression testing module 404.

The subset of test cases 401 that are included in regression suspect test cases 405 are then processed sequentially (i.e., one at a time), by regression testing module 404 as described above with respect to block 202 of method 200 of FIG. 2, in order to identify any test cases of regression suspect test cases 405 that correspond to confirmed regressions in the current build of the compiler 402B (i.e., confirmed regression test cases 406). The confirmed regression test cases 406 may be identified by, for example, an increase in the CPU time or elapsed time consumed by compiling and running a test case of regression suspect test cases 405 using the current build of the compiler 402B, as compared to the CPU time or elapsed time consumed by compiling and running the test case of regression suspect test cases 405 using the previous build of the compiler 402A. The confirmed regression test cases 406 may be output by regression testing module 404 in block 203 of FIG. 2, and may be used to analyze the current build of the compiler 402B for performance regressions by, for example, a software developer.

It is to be understood that the block diagram of FIG. 4 is not intended to indicate that the system 400 is to include all of the components shown in FIG. 4. Rather, the system 400 can include any appropriate fewer or additional components not illustrated in FIG. 4 (e.g., additional memory components, embedded controllers, functional blocks, connections between functional blocks, modules, inputs, outputs, etc.). Further, the embodiments described herein with respect to system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a the logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   identifying, by a processor, a subset of a plurality of test cases, wherein the subset comprises test cases of the plurality of test cases that are identified as regression suspects for a current build of a compiler, and wherein identifying a test case of the plurality of test cases as belonging to the subset comprises:
   determining a first instruction count associated with compiling or running of the test case based on the current build of the compiler; and
   determining a second instruction count associated with compiling or running of the test case based on a previous build of the compiler;
   determining a difference between the second instruction count and the first instruction count; and
   adding the test case to the subset based on the difference between the second instruction count and the first instruction count being above a threshold; and
   processing the subset of the plurality of test cases to identify any test cases associated with confirmed regressions.

2. The method of claim 1, wherein identifying the subset of the plurality of test cases comprises processing the plurality of test cases in parallel, and wherein processing the subset of the plurality of test cases to identify any test cases associated with confirmed regressions comprises processing the subset of the plurality of test cases sequentially.

3. The method of claim 1, wherein identifying a test case of the plurality of test cases as belonging to the subset comprises:
   compiling the test case by the previous build of the compiler;
   determining the second instruction count based on the compiling of the test case by the previous build of the compiler;
   compiling the test case by the current build of the compiler; and
   determining the first instruction count based on the compiling of the test case by the current build of the compiler.

4. The method of claim 1, wherein the threshold comprises a percentage increase or decrease in the first instruction count with respect to the second instruction count.

5. The method of claim 1, wherein identifying a test case of the plurality of test cases as belonging to the subset comprises:
   running first object code of the test case that was compiled by the previous build of the compiler;
   determining the second instruction count based on the running of the first object code;

running second object code of the test case that was compiled by the current build of the compiler; and determining the first instruction count based on the running of the second object code.

6. The method of claim 1, wherein processing the subset of the plurality of test cases to identify any test cases associated with confirmed regressions comprises:

determining a first time, the first time comprising one of a first central processing unit (CPU) time or a first elapsed time, for a test case of the subset of the plurality of test cases associated with the previous build of the compiler;

determining a second time, the second time comprising one of a second CPU time or a second elapsed time, for the test case of the plurality of test cases associated with the current build of the compiler;

determining that the test case is associated with a confirmed regression based on an increase in the second time with respect to the first time, wherein the compiler is modified based on the test case that is associated with the confirmed regression.

7. A system comprising:

a memory having computer readable instructions; and one or more processors for executing the computer readable instructions, the computer readable instructions controlling the one or more processors to perform operations comprising:

identifying a subset of a plurality of test cases, wherein the subset comprises test cases of the plurality of test cases that are identified as regression suspects for a current build of a compiler, and wherein identifying a test case of the plurality of test cases as belonging to the subset comprises:

determining a first instruction count associated with compiling or running of the test case based on the current build of the compiler; and determining a second instruction count associated with compiling or running of the test case based on a previous build of the compiler;

determining a difference between the second instruction count and the first instruction count; and adding the test case to the subset based on the difference between the second instruction count and the first instruction count being above a threshold; and processing the subset of the plurality of test cases to identify any test cases associated with confirmed regressions.

8. The system of claim 7, wherein identifying the subset of the plurality of test cases comprises processing the plurality of test cases in parallel, and wherein processing the subset of the plurality of test cases to identify any test cases associated with confirmed regressions comprises processing the subset of the plurality of test cases sequentially.

9. The system of claim 7, wherein identifying a test case of the plurality of test cases as belonging to the subset comprises:

compiling the test case by the previous build of the compiler;

determining the second instruction count based on the compiling of the test case by the previous build of the compiler;

compiling the test case by the current build of the compiler; and determining the first instruction count based on the compiling of the test case by the current build of the compiler.

10. The system of claim 7, wherein the threshold comprises a percentage increase or decrease in the first instruction count with respect to the second instruction count.

11. The system of claim 7, wherein identifying a test case of the plurality of test cases as belonging to the subset comprises:

running first object code of the test case that was compiled by the previous build of the compiler;

determining the second instruction count based on the running of the first object code;

running second object code of the test case that was compiled by the current build of the compiler; and determining the first instruction count based on the running of the second object code.

12. The system of claim 7, wherein processing the subset of the plurality of test cases to identify any test cases associated with confirmed regressions comprises:

determining a first time, the first time comprising one of a first central processing unit (CPU) time or a first elapsed time, for a test case of the subset of the plurality of test cases associated with the previous build of the compiler;

determining a second time, the second time comprising one of a second CPU time or a second elapsed time, for the test case of the plurality of test cases associated with the current build of the compiler;

determining that the test case is associated with a confirmed regression based on an increase in the second time with respect to the first time, wherein the compiler is modified based on the test case that is associated with the confirmed regression.

13. A computer program product comprising a computer readable storage medium having program instructions embodied therewith, the program instructions executable by a processor to cause the processor to perform operations comprising:

identifying a subset of a plurality of test cases, wherein the subset comprises test cases of the plurality of test cases that are identified as regression suspects for a current build of a compiler, and wherein identifying a test case of the plurality of test cases as belonging to the subset comprises:

determining a first instruction count associated with compiling or running of the test case based on the current build of the compiler; and determining a second instruction count associated with compiling or running of the test case based on a previous build of the compiler;

determining a difference between the second instruction count and the first instruction count; and adding the test case to the subset based on the difference between the second instruction count and the first instruction count being above a threshold; and processing the subset of the plurality of test cases to identify any test cases associated with confirmed regressions.

14. The computer program product of claim 13, wherein identifying the subset of the plurality of test cases comprises processing the plurality of test cases in parallel, and wherein processing the subset of the plurality of test cases to identify any test cases associated with confirmed regressions comprises processing the subset of the plurality of test cases sequentially.

15. The computer program product of claim 13, wherein identifying a test case of the plurality of test cases as belonging to the subset comprises:

compiling the test case by the previous build of the compiler;

determining the second instruction count based on the compiling of the test case by the previous build of the compiler;

compiling the test case by the current build of the compiler; and determining the first instruction count based on the compiling of the test case by the current build of the compiler.

16. The computer program product of claim 13, wherein the threshold comprises a percentage increase or decrease in the first instruction count with respect to the second instruction count.

17. The computer program product of claim 13, wherein identifying a test case of the plurality of test cases as belonging to the subset comprises:

running first object code of the test case that was compiled by the previous build of the compiler;

determining the second instruction count based on the running of the first object code;

running second object code of the test case that was compiled by the current build of the compiler; and determining the first instruction count based on the running of the second object code.

* * * * *